United States Patent [19]

Hauck

[11] 3,725,876

[45] Apr. 3, 1973

[54] DATA PROCESSOR HAVING AN ADDRESSABLE LOCAL MEMORY LINKED TO A MEMORY STACK AS AN EXTENSION THEREOF

[75] Inventor: Erwin A. Hauck, Arcadia, Calif.

[73] Assignee: Burroughs Corportion, Detroit, Mich.

[22] Filed: Feb. 8, 1972

[21] Appl. No.: 224,420

[52] U.S. Cl. ....................340/172.5

[51] Int. Cl. ....................G06f 7/10, G11b 27/00

[58] Field of Search ....................340/172.5

[56] References Cited

UNITED STATES PATENTS

| | | | |
|---|---|---|---|
| 3,351,913 | 11/1967 | Pine | 340/172.5 |
| 3,401,376 | 9/1968 | Barnes et al. | 340/172.5 |
| 3,544,974 | 12/1970 | Tan | 340/172.5 |
| 3,546,676 | 12/1970 | Ragen | 340/172.5 |
| 3,553,651 | 1/1971 | Bird et al. | 340/172.5 |
| 3,564,227 | 2/1971 | Bowers | 235/168 |
| 3,546,677 | 12/1970 | Barton et al. | 340/172.5 |
| 3,548,384 | 12/1970 | Barton et al. | 340/172.5 |
| 3,601,809 | 8/1971 | Gray | 340/172.5 |
| 3,624,616 | 11/1971 | Patel | 340/172.5 |
| 3,629,857 | 12/1971 | Faber | 340/172.5 |

*Primary Examiner*—Paul J. Henon
*Assistant Examiner*—Jan E. Rhoads
*Attorney*—Robert L. Parker et al.

[57] ABSTRACT

A data processing system has a main memory for storing a stack of information for processing. Stored in the main memory stack are control words which mark off procedural areas of the stack, operand words for processing, and reference words for indicating locations of control words and of operand words. A pair of high speed registers are provided for coupling information to the processor's arithmetic unit for processing. These two registers are linked to the stack so that they are the top two available locations of the stack. The processor includes a plurality of high speed registers which are linked to the memory stack to form a stack extension. Stored in the stack extension are control words that form a part of an address environment list and a stack history list; parameters that are local to the current addressing environment; and operands that have been called to the top of the stack. Words stored in the stack extension are captured and are not pushed down into the memory stack during the execution of a procedure. Means are provided for addressing each register within the stack extension and for coupling captured information therein to the register which is the top available location of the stack. Means are provided for updating the stack extension when a new procedure is entered so that it will capture the information relating to the new procedure.

17 Claims, 11 Drawing Figures

DATA PROCESSOR HAVING AN ADDRESSABLE LOCAL MEMORY LINKED TO A MEMORY STACK AS AN EXTENSION THEREOF

CROSS-REFERENCES TO RELATED APPLICATIONS

This application is related to copending application Ser. No. 224,435, filed Feb. 8, 1972, by John R. Werner and entitled "Data Processing Method and Apparatus Using Occupancy Indications to Reserve, Etc.," and assigned to the same assignee.

BACKGROUND OF THE INVENTION

1. Field of the Invention

This invention relates to data processing systems and, more particularly, to data processors employing stack mechanisms. 2. Description of the Prior Art Prior art data processors have included apparatus, commonly called a stack mechanism, for exchanging information items with a main memory on a last-in, first-out (LIFO) basis thereby building a stack. As a stack is built-up the data processor obtains information items from the memory and the stack mechanism stores these information items in sequential locations of the main memory by what are called pushdown operations. The stack mechanism retrieves the information items in an order reversed from the order in which they are stored by what are called pop-up operations. The information item last pushed down into the stack and not yet popped-up is considered to be the top information item in the memory stack.

Stack mechanisms can build stacks in main memory consisting of several different types of information items. The stack can consist entirely of operands, entirely of control words, or a mixture of operands and control words. When the stack consists entirely of operands the stack is called an operand stack. An operand stack is built up on a pure LIFO basis. That is, the operands in the stack can be brought out of the memory only in an order reversed from the order in which they were brought in. In other words, there is no random access addressing means by which the programmer can order operands to be brought out of the stack in a different order. Since the operands cannot be addressed by the programmer they are said to be invisible to the programmer. The means for storing an operand stack typically comprises first and second high speed registers and a part of the main memory. A stack mechanism that is used in connection with an operand stack typically comprises means for linking these two high speed registers to the memory stack so that they form the top two available locations of the stack storage means and a part of the control unit of the processor which produces control signals for causing operands in the stack to be popped-up and pushed-down. This linkage is accomplished by providing an occupancy-indicating flip-flop for each of the two high speed registers and a stack pointer register. The stack pointer register stores an indication of the main memory location storing the top of memory stack operand. Each occupancy flip-flop stores an indication of whether or not there is a valid operand in its associated register.

An operand stack is particularly suited to facilitate the computation of equations that are expressed in Polish notation. Such equations are parenthesis free and consist of a string of operands and operators. A convention is established whereby each arithmetic operator operates on two immediately preceding operands. Consider, for example, the Polish notation string $a\ b\ c + x$. The two operands preceding the plus sign are $b$ and $c$ and therefore the plus sign indicates that a new operand $(b + c)$ should be formed. Now the two operands preceding the multiply sign become $(b + c)$ and $a$. Therefore the multiply sign indicates that the new operand $(a)\times(b+c)$ should be formed. Each time a pair of operands are operated upon to form a new single operand they are said to be "digested".

A program for the exemplary Polish notation string given above and the response thereto of a prior art processor is as follows. A program operator orders the processor to fetch the operand a from an indicated location of the memory and to place a at the top of the stack. The stack mechanism responds to adjust the stack down. In adjusting the stack down the stack mechanism checks the first occupancy-indicating flip-flop. If it is indicated that a valid operand is stored therein the contents of the second register is pushed down into the memory stack and then replaced by the contents of the first register. After the stack has been adjusted down the first register is unoccupied and is therefore available to store the operand a. Then the operand a is fetched from memory and stored into the first register. Simultaneously, the first occupancy flip-flop is set to indicate that the first register contains a valid operand. A second and third program operator then orders the processor to place the operands b and c respectively at the top of the stack, and the processor responds as described above.

At this point the operand a is now the top of memory stack operand; the operand b is stored in the second register; and the operand c is the top of stack operand and is stored in the first register. Next a program operator orders an add operation. The processor responds to couple the contents of the first and second registers to the arithmetic unit which produces the sum $(b + c)$ and stores this sum back into the second register. Simultaneously the first occupancy flip-flop is reset to indicate that the first register does not contain a valid operand. This is done because the operands b and c have been digested. Next a program operator orders a multiply operation. The stack mechanism responds to adjust the stack up. In adjusting the stack up the stack mechanism checks the first occupancy-indicating flip-flop and finds that no valid operand is stored in the first register. Therefore, the contents of the second register $(b + c)$ are transferred to the first register and the operand at the top of memory stack (operand a) is retrieved from memory and stored into the second register. The processor then couples the contents of the first and second registers to the arithmetic unit which produces the product $(a)\times(b+c)$ and stores this product back into the second register.

The above-described example illustrates one of two related problems that arise in the operation of a stack. Both of these problems stem from the fact that the time required for a main memory access is large compared to the time required for a register to register transfer within the processor. Since the transfer of information back and forth between main memory and the processor takes a relatively large amount of time, the system throughput is adversely affected by repeated main memory accesses. The adverse effect of the first problem is measured in terms of what is called stack adjustment overhead. Note that in the above-described example the processor read out the operand a from main memory, did nothing of significance with it, stored it back into main memory, and subsequently read it out again for use in connection with the multiply operation. Thus three main memory accesses were involved before the operand a was digested. Such repeated main memory accesses are time consuming and seriously affect the computing power of the machine.

The related problem of repeated main memory accesses does not directly involve the pop-up, push-down operations of a LIFO memory. This problem arises in connection with obtaining information from indicated locations of the main memory for placement in the stack. To understand this problem consider first an oversimplified example of the computation of $a^3$. In Polish notation $a^3$ is expressed as aaaxx. A program for this Polish notation string could make three consecutive main memory accesses to fetch the same variable for placing the variable at the top of the stack three consecutive times. Then two multiply operators would cause the three operands to be digested to form $a^3$. This related problem is manifested whenever the same operand must be brought to the top of the stack several different times during the execution of a program string. This related problem becomes especially aggravated when the locations of the desired operand is indicated by an indirect address. An indirect address is an address that specifies a location whose contents is either an address or another indirect address. The contents of the specified location are used to obtain the actual operand. Thus a chain of main memory accesses may be necessary to obtain a single desired operand for placement in the stack.

An approach taken in the prior art to alleviate the first problem discussed above is disclosed in U.S. Pat. No. 3,401,376 by G. H. Barnes et al., entitled CENTRAL PROCESSOR and assigned to the assignee of this invention. This patent discloses a data processor which includes the usual pair of high speed registers and additionally includes 12 other high speed registers that operate as an operand stack extension. In this machine the stack is adjusted down by pushing the operands out of the pair of high speed registers down into the stack extension instead of writing them into the main memory immediately. Also the stack is adjusted up by popping up operands from the stack extension instead of reading them out from the top of the stack in main memory. The last operand pushed down into the stack extension is always the first word popped up into the pair of high speed registers. Thus the operands stored in this stack extension are "invisible" to the programmer. Although this stack extension is a pure LIFO memory with respect to operand transfers between it and the pair of high speed registers, it operates on a first-in, first-out (FIFO) basis with respect to transfers of operands that pass through the stack extension to the main memory. This is because the operands at the bottom of the stack extension are pushed out of the bottom of the stack extension into the operand stack in the main memory when it becomes necessary to make space available in the stack extension for storage of more operands. Thus as a series of operands are pushed down into the stack extension the first operand moves down through the stack extension and after the stack extension is full the first operand is the first of the series to be pushed down into the stack in main memory.

A second type of stack consisting entirely of control words has been used to link different parts of a program together. Frequently in the execution of a program it becomes necessary for a first procedure to call a second procedure. When such a call occurs it is necessary to remember the point in the first procedure where the processor should return at the completion of the second procedure. Furthermore, a called procedure can itself call a different procedure and therefore it is necessary to remember a plurality of return points. Thus a stack for storing a plurality of return points can be called a subroutine control stack.

A third type of stack consisting of a mixture of operands and control words is disclosed in U.S. Pat. No. 3,153,225 by J. N. Merner et al., entitled DATA PROCESSOR WITH IMPROVED SUBROUTINE CONTROL and assigned to the assignee of this invention. The data processor of this patent includes means for inserting control words into the stack as well as operands so as to mark off areas of the stack that are related to particular subroutines. The insertion of these control words into the stack serves several functions. One function is to provide subroutine linkage information by creating a linked list denoting the stack history. Another function is to provide base addresses for relative addressing within the stack. During subroutine execution a program operator can call on or obtain a parameter that is stored within the stack even though the parameter cannot be popped up immediately because it was not the last item entered into the stack. Thus this type of stack is not a pure LIFO stack, and the words within the stack are considered to be "visible" to the programmer.

An advantage arises from the provision of means for addressing within a stack and rendering the words therein visible. That is that once an information item has been placed in the stack it can be brought to the top of the stack again without using indirect addressing techniques and the attendant multiplicity of main memory accesses.

U.S. Pat. No. 3,461,435 by R. S. Barton et al., entitled STACK MECHANISM HAVING MULTIPLE DISPLAY REGISTERS and assigned to the assignee of this invention, also discloses a stack mechanism that stores in a single stack both operands and sub-routine control information. The data processor disclosed in this patent discloses improved apparatus for addressing within a stack. The processor has a plurality of display registers each of which stores an address of a control word which marks the stack. Each stored address is a base address for base relative addressing within the stack. All of the base addresses for the current procedural addressing environment are made visible by the display registers.

Application Ser. No. 672,042, filed Oct. 2, 1967, entitled PROCEDURE ENTRY FOR A DATA PROCESSOR EMPLOYING A STACK and assigned to the assignee of this invention, is directed to the method and means by which the above-mentioned display registers are updated upon entry into a procedure. This application describes in detail how the information contained within the control words in the stack can be used in the execution of programs expressed in ALGOL-like languages.

A program written in ALGOL is arranged in blocks. A block comprises one or more statements that order certain actions, declarations or parameters, variables or procedures; and the statements, begin and end, which mark the boundaries of the block. In the prior art computing machine described in the above-referenced application, a stack storage area in main memory is earmarked for each procedural block.

Each procedural block storage area of a stack has a Mark Stack Control Word (MSCW). The MSCW is located at the beginning or base of each block storage area and serves to identify the particular block storage area. A Return Control Word (RCW) is located in the next location above each MSCW. The RCW contains information that is used to return to a calling procedure. In successive locations of the stack upwardly from the RCW of a particular block are the parameters that have been passed to the procedure and references to variables and procedures that have been declared local to that procedure.

Parameters are located in the stack by a lexicographical level value (ll) plus an increment value (δ). These two values, in combination, are called an address couple. The lexicographical level selects one of the display registers and the absolute address in the display register is added to the increment value to give the address of the desired parameter.

SUMMARY OF THE INVENTION

The present invention is directed to an improved stack organization that stores information items such as parameters and variables in a high speed addressable memory which is linked to the main memory to form a stack extension. In contrast to prior stack extensions, information items stored in the stack extension of the present invention are not pushed down out of the bottom thereof into main memory but instead are captured therein during the execution of a procedure. In further contrast the stack extension of the present invention is addressable and captured parameters can be referred to repeatedly in the stack extension and brought to the top of the stack in any desired order. Thus the present invention substantially reduces the number of main memory accesses involved in bringing words to the top of the stack and in stack adjustment operations.

Briefly, an embodiment of the present invention comprises a plurality of high speed registers linkable to an active stack so as to form a stack extension. Means are provided for addressing the high speed registers and for transferring information therein to a pair of high speed registers that form the top of the active stack. Means are provided for storing control words in the stack extension to mark the stack and to link the stack extension to other procedures.

A preferred embodiment of the present invention is in a data processor having a plurality of display registers which store addresses of control words marking procedural areas of the stack. The addresses stored in the display registers serve as base addresses for base relative addressing within the stack. In this preferred embodiment the apparatus of the present invention includes an addressable local memory for the processor. The addressable local memory is linked to the main memory and stores a part of the stack which is used for a level of the program. A mark word is stored in a register in the local addressable memory and the address of this register serves as a base address for relative addressing within the local memory. A register is provided for storing a reference word which includes a level field and an index field. Indirect addressing techniques are used to obtain a base address from the level field and base relative addressing techniques are used to obtain a desired item from the obtained base address and the index field. Means are provided for addressing the local memory to obtain a desired item instead of the main memory in response to an indication that the level field of the reference word is the same as the level value of the procedure currently being executed. Thus a desired data item can be brought to the top of the stack without accessing the main memory.

A feature of the invention resides in the means for reserving an area of the main memory stack and for transferring information from the stack extension to the reserved area in block transmitting fashion when a new procedure is entered.

Another feature of the invention resides in the means for storing into main memory information related to the active stack that will not fit into the stack extension. In this regard when the stack extension is filled, additional information is added to the stack extending out of the top of the stack extension into main memory. The stack extension according to the present invention which captures information items and prevents them from being pushed down into main memory is important because the first items stored into the stack extensions are usually parameters which are most often accessed for use in processing. Hence minimum access time to these parameters is achieved by keeping them in the higher speed stack extension. This is in contrast to the prior art stack extension where the first stored information items are pushed out of the bottom of the stack extension into main memory.

GENERAL DESCRIPTION

Figure 1:
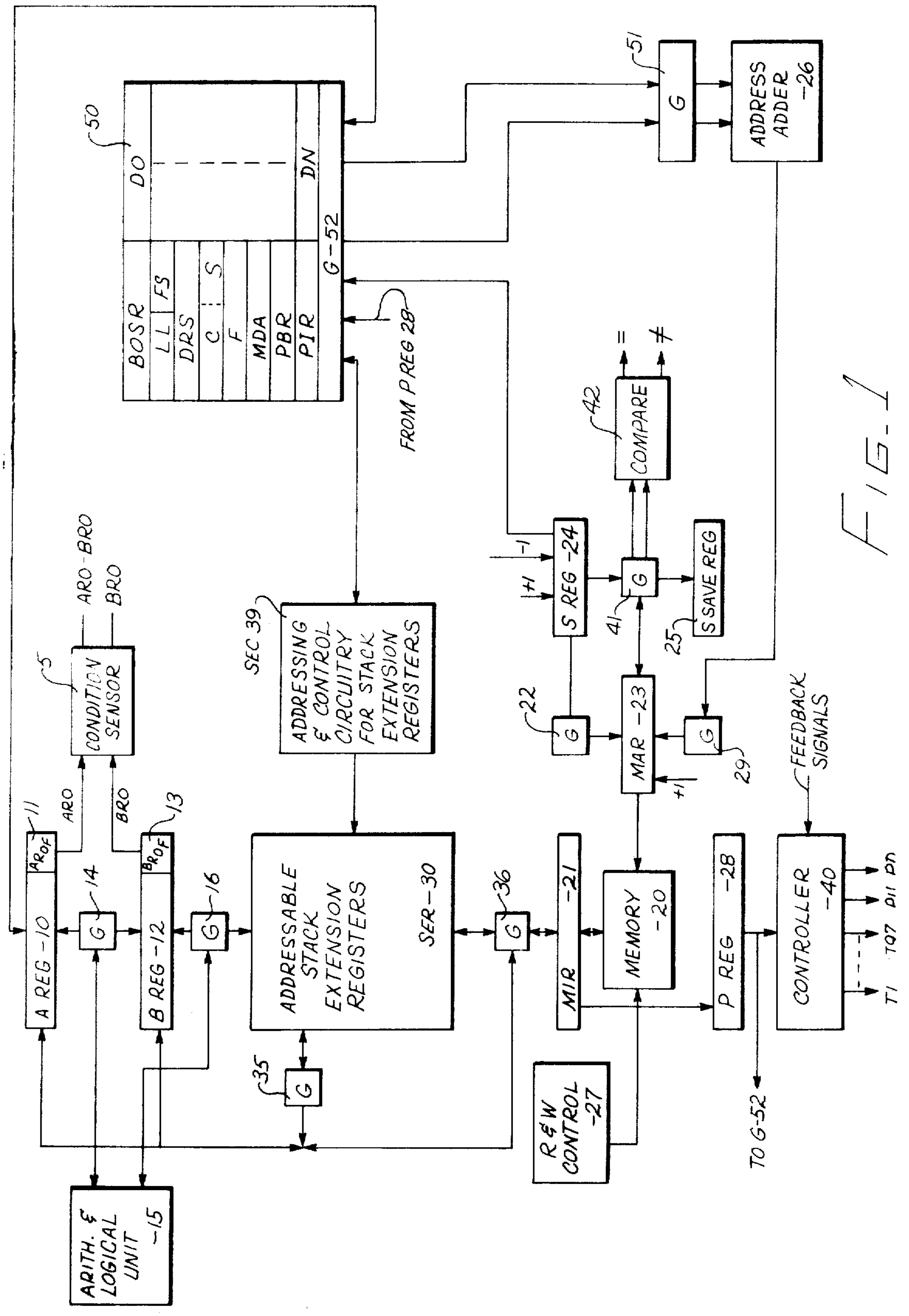
FIG. 1 is an overall block diagram of a data processing system embodying the present invention.

Before considering the details of the construction and operation of the preferred embodiment of the data processing system consider first the general functions of its major components in connection with the block diagram of FIG. 1. The data processing system has a main memory shown at 20 and a stack organized data processor shown generally throughout the rest of FIG. 1. The processor includes a local memory shown as addressable stack extension registers 30. This local memory is addressable and can be accessed more quickly than the main memory.

The main memory stores programs comprising executable strings of program operators. Program operators are read out of the main memory and decoded, and the processor executes the operations ordered by the program operators. Controller 40 responds to each program operator by forming the necessary control signals which control the processor's execution of the program operator. Among the control signals produced by controller 40 are the control signals which cause words to be popped up and pushed down in a stack storage means.

The stack storage means comprises A register 10, B register 12, and a stack storage memory which consists of the local memory and the main memory taken together. A register 10 and B register 12 provide a linkage between a stack and an arithmetic unit shown at 15. In addition to actually storing a part of a stack, the main memory has locations which are reserved for possible future storage of the part of the stack stored in the local memory. The part of the stack which is stored in the local memory is an extension of the part of the stack actually stored in the main memory below the reserved locations. An example of a distribution of words in a stack between the local memory and the main memory is illustrated in FIG. 4A which also illustrates that locations of the main memory have been reserved.

The system provides means for keeping track of where the top of the stack is stored. The word at the top of the stack can be stored in A register 10, B register 12 or the stack storage memory. In addition there is provided an indication of the location of the stack storage memory storing the top of memory stack word. These means comprise a pair of occupancy indicating flip-flops, AROF 11 and BROF 13; a TOSE register 38 (shown in FIG. 2) within control circuitry SEC39; and S register 24. When A register 10 stores the word at the top of the stack AROF 11 indicates that A register 10 is occupied. When B register 12 stores the word at the top of the stack AROF 11 indicates that A register 10 is unoccupied and BROF 13 indicates that B register 12 is occupied. TOSE register 38 stores an indication of the location of the top word stored in the local memory. S register 24 stores an indication of a location in the main memory which location has been reserved for storing the top of memory stack word.

Since a part of the stack is stored in the local memory and another part is stored in memory 20 the system provides a means for linking the parts of the stack together. In the preferred embodiment this linkage is achieved by S register 24 which stores the address of a location within memory 20. The contents of S register 24 are incremented and decremented during pop-up and push-down operations and thereby keeps track of the location of memory 20 which is reserved for storing the top of memory stack word.

The stack of information can be changed in various ways by the execution of different program operators. These changes include stack expansion, stack contraction and storage of a word within a stack.

Stack expansion occurs when a new word is placed at the top of the stack. This new word can be obtained from a non-stack area such as a data array stored in memory 20. Alternatively the new word can be obtained from within the stack itself because the words within the stack of the present invention are made visible to the programmer. In either case the stack expands or is built up by obtaining the new word and storing the new word in A register 10.

Stack contraction occurs in different ways. For example when two operands are digested in response to a program operator to form a single new operand of a Polish notation string the stack contracts. As another example when a program exits from one procedure to another the stack contracts by deleting words related to the procedure exited from.

The stack can also be changed by the storage of a word within the stack. That is, the processor has the capability of selecting a stack storage location within the stack for storage of a word as well as the capability of inserting a new word into the top of stack storage location.

The stack of information expands or is built up by obtaining a new word and storing the new word in A register 10. However, if A register 10 is already occupied with a word which should not be overwritten the system performs a push-down type of stack adjustment operation. AROF 11 provides an indication of whether A register 10 is available or whether a push-down operation is necessary. When a push-down operation is necessary the contents of A register 10 are first transferred to B register 12 so that A register 10 will be available for storing the new word. However if B register 12 also is storing a word which should not be overwritten it is necessary first to make B register 12 available. BROF 13 is an occupancy indicating flip-flop which provides an indication of whether or not B register 12 is available. A word pushed down out of B register 12 can be written into either the memory 20 or into the local memory.

Ordinarily, words are pushed down out of B register 12 into the local memory rather than into memory 20. However if the local memory does not have an available location the word is written into memory 20. The addressing and control circuitry (SEC 39) provides an indication of whether there is an available location in the local memory. In addition, SEC 39 provides an indication of a particular register within the local memory into which the word will be written when the local memory is not full. When the local memory is full and the word must be written into memory 20 the word is written into the memory location indicated by S register 24. From the foregoing it can be seen that words which have been written into the local memory are captured therein in that they are not pushed down out of the bottom of the local memory into memory 20.

Although words which have been stored into the local memory are captured therein in that they are not pushed down out of the local memory they of course do not permanently reside therein. For example, two operands which have been pushed down into the local memory can be popped up again and digested. As another example the words within the local memory can be "flushed out" or transferred over to the main memory stack. In the preferred embodiment the words are captured in the local memory during the execution of a procedure. When the program enters a new procedure the words remaining in the local memory relating to the old procedure are transmitted in block fashion over to the main memory so that there will be more available space in the local memory for the new procedure.

DESCRIPTION OF THE PREFERRED EMBODIMENT

FIG. 1 shows in block diagram form the major components of a computer system embodying the present invention.

Controller 40 is a conventional sequential timing circuit having an input circuit accepting signals from P register 28 and from other circuit elements of the processor and having an output circuit on which it produces sequences of timing and control signals. The output circuit of controller 40 is connected to a plurality of lines which are identified in the drawings by the symbols T1 through T97 and PU and PD. These output lines are coupled by lines not shown so as to apply timing and control signals to other circuits of the processor and thereby cause these other circuits to manipulate data.

P register 28 comprises a register and decoding network that stores the program operator that is currently being executed by the processor. P register 28 decodes the current program operator and applies a signal to controller 40 to cause it to produce the timing and control signals necessary to carry out that program operator.

The sequence of timing and control signals necessary to carry out the data manipulations ordered by a particular program operator often depends upon the results of various tests that compare the conditions of various registers within the processor. Thus there are a plurality of lines carrying signals from the various test registers back to the controller 40. It would unduly complicate FIG. 1 to show all of the connections between the various test registers and controller 40. Therefore, a single line referenced as feedback signal line is shown to suggest the existence of the many lines that are coupled back to controller 40. The actual sequence of the timing and control signals produced by controller 40 during the execution of various operations will be discussed hereafter in connection with the description of the flow charts of FIGS. 5–10.

Memory 20 is a conventional random access memory and operates in a manner well known in the computer art. Stored in memory 20 are program operators that direct the processor to perform various operations, data that will be processed, and stacks of operands and control words of various types.

Information is written into and read from memory 20 under the control of a read and write unit RW27. RW27 is responsive to timing signals derived from controller 40 to cause an exchange of information between a memory information register MIR21 and a selected one of the memory locations within memory 20. Particular locations of memory 20 are selected by a memory address register shown as MAR23.

Absolute addresses are entered into MAR23 from S register 24 through gate 22. S register 24 is incremented and decremented in response to control signals derived from controller 40 so that it keeps track of the memory location that is considered to be the top location of a memory stack. The contents of S register 24 can be gated into S Save register 25 through gate 41 in response to a control signal derived from controller 40. Compare circuit 42 has two inputs coupled to gate 41 and has two outputs on which it forms signals that indicate whether or not equality exists between its inputs. The purpose of S Save register 25 and compare circuit 42 will be explained hereafter.

Absolute addresses are also entered into MAR23 from address adder 26 through gate 29. Address adder 26 is responsive to a base address and an increment to produce an actual memory address. The sources of the base addresses and the increments vary, depending upon whether a program operator or other type of word is being addressed. Thus, gates 51 and 52 are responsive to control signals from controller 40 to couple the address adder to a selected pair of registers shown within block 50.

For example, the address of the program operator is calculated by address adder 26 when gate 51 transfers the contents of a program base register (PBR) and a program index register (PIR) to the inputs of address adder 26. The addressed program operators are read from memory 20 into MIR21 and then transferred to P register 28 for decoding. In some cases a program operator contains a field which must be stored temporarily in one of the registers within block 50. To that end, the output of P register 28 is coupled by a line not shown to gate 52 which controls the exchange of information with the registers of block 50.

Absolute addresses of words within a memory stack are produced in substantially the same manner as disclosed in above-identified U.S. Pat. No. 3,461,434. Thus within block 50 there are a plurality of display registers (DO-DN) each for storing the address of an MSCW and an LL register storing an $ll_c$ value indicative of the current lexicographical level of the program. When a program operator stored in P register 28 makes reference to a location within the stack, the program operator contains a field that orders a read or write operation and a field that indicates a location within the stack by means of an address couple. Controller 40 responds to such a program operator to cause the address couple to be gated through gate 52 into a C register within block 50. A display register selection circuit shown within block 50 and referenced as DRS compares the ll part of the address couple against the $ll_c$ value stored in the LL register. As will be explained in more detail hereafter in connection with the description of FIG. 10 when the ll part of the address couple is smaller than the $ll_c$ value the stack location referred to is in memory 20. When the stack location referred to is in memory 20, DRS selects the display register corresponding to ll value of the address couple and causes the contents of the selected display register to be transferred through gates 52 and 51 to one input of address adder 26. DRS also causes the δ part of the address couple to be transferred through gates 52 and 51 to the other input of address adder 26. Address adder 26 will produce the sum of the contents of the selected display register and the δ value. This sum is the absolute address of the referenced location and is transferred through gate 29 to MAR23. It should be noted that although the preferred embodiment of the computer system embodying the present invention includes a plurality of display registers this invention is applicable to other stack organized machines such as that disclosed in above-identified U.S. Pat. No. 3,153,225. Words from a stack are read from memory 20 into MIR21 and then transferred through gate 36 to registers within the processors.

The absolute addresses stored in MAR23 can be incremented by one under the control of controller 40. The purpose of incrementing MAR23 will be described in connection with the description of FIG. 9.

A register 10 and B register 12 which are coupled together by gate 14 form the top two locations of a stack and are time-shared between the various stacks co-existing within memory 20. AROF 11 and BROF 13 are a pair of flip-flops associated with the A and B registers and produce ARO and BRO signals respectively that serve to indicate whether these registers are occupied with valid information or are empty. When A register 10 contains a valid word the ARO signal is a 1 and it is a 0 otherwise. Similarly, when B register 12 contains a valid word the BRO signal is a 1 and is 0 otherwise. The ARO and BRO signals are coupled to condition sensor 5 which includes conventional gates that respond to the various states of ARO and BRO to produce indicating signals that are used in adjusting the stack. The signals shown in FIG. 1 are ARO·BRO and BRO . The conditions which they indicate are as follows: ARO·BRO = 1, indicates that both A register 10 and B register 12 are full; ARO·BRO = 0, indicates that both A register 10 and B register 12 are empty; BRO = 0, indicates that B register 12 is empty; and BRO = 1, indicates that B register 12 is full.

A register 10 and B register 12 are coupled through gates 14 and 16, respectively, to arithmetic logical unit (A and L15). A and L15 contains the necessary circuitry to process data that are contained in the A and B registers in response to predetermined program operators, such as add, subtract and the like.

Figure 2:
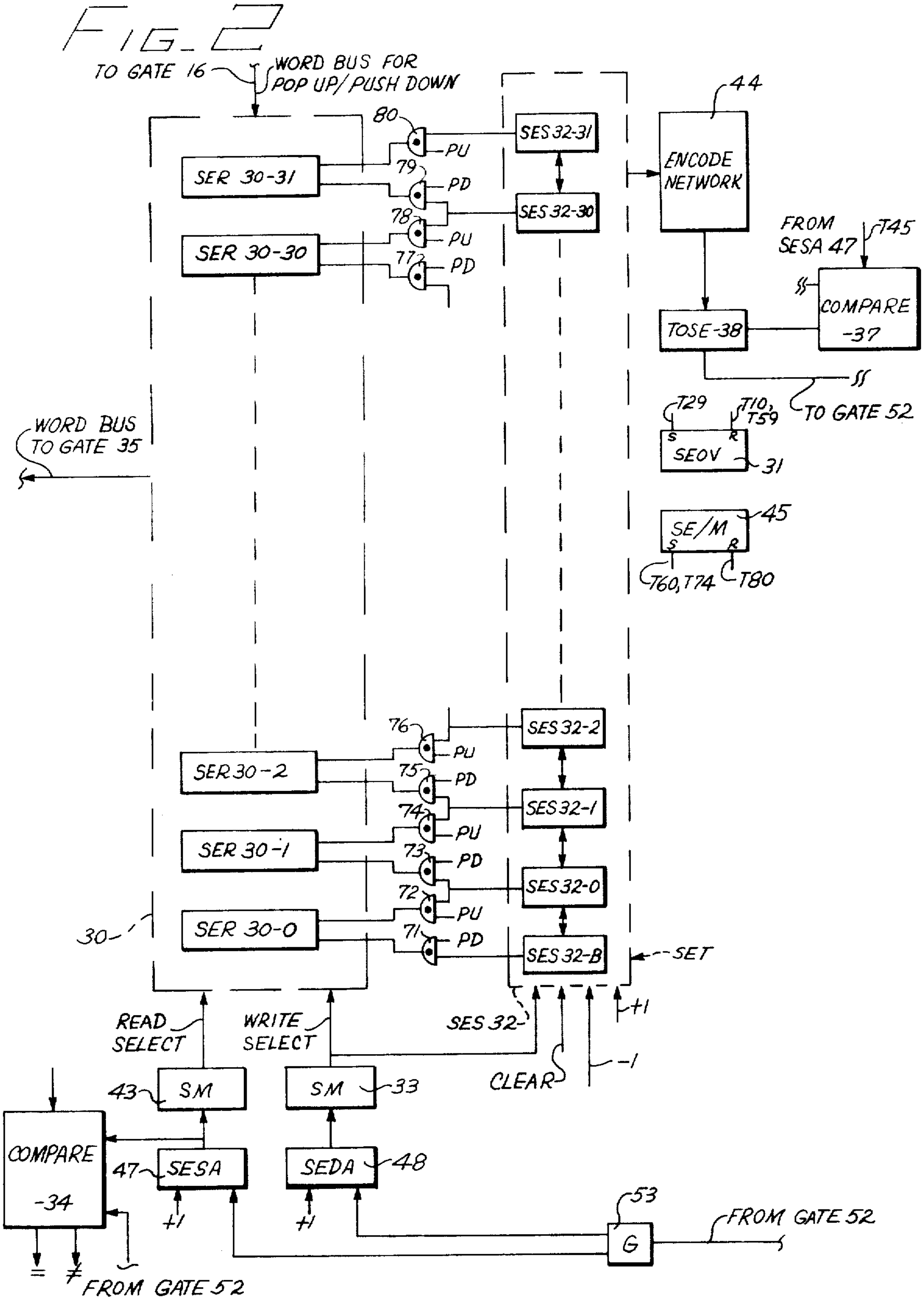
FIG. 2 is a block diagram showing the details of the stack extension registers and their associated addressing and control circuitry.

The addressable stack extension registers (SER30) and its associated addressing and control circuitry (SEC39) are important elements of an embodiment of the present invention and are shown in more detail in FIG. 2. For purposes of understanding FIG. 1 it is sufficient to know that SER30 comprises a plurality of registers that can be linked as an extension to a memory stack. Information is written into and read from SER30 under the control of SEC39. SER30 is coupled to B register 12 through gate 16 so that words can be popped up from and pushed down into the registers within SER30.

SER30 is also coupled to A register 10 through gate 35 so as to enable words to be transferred in either direction between A register 10 and the registers within SER30. As will be explained in more detail hereafter SEC39 contains the necessary control circuitry to select an arbitrary register within SER30 and cause a word to be transferred between A register 10 and the selected register.

SER30 is also coupled to memory 20 through gate 36 and MIR21 so as to permit words to be exchanged therebetween.

Also shown in FIG. 1 within block 50 are a base of stack register (BOSR), an F register, an FS register, and an MDA register. The contents of the BOSR points to the MSCW at the base of the current stack. The contents of the F register points to a main memory location which either actually stores or has been reserved for storage of the MSCW last entered into the stack. The contents of the FS register points to a location within SER30. The location pointed to is the one which stores the IMSCW last placed in the SER30. The MDA (memory destination address) register is used for temporary storage of a main memory address. Its function and operation will be explained in connection with FIG. 8.

FIG. 2 shows generally the addressing and control circuitry for and its connection with SER30. In the preferred embodiment SER30 has 32 registers (not all shown) referenced as SER30–0 through SER30–31. The number of registers could be larger or smaller depending upon various factors and is selected on the basis of a tradeoff analysis of the marginal cost and utility of the registers.

Each of the 32 registers of SER30 is coupled by means not shown to two word buses. One of these word buses carries words that are being exchanged with B register 12 through gate 16 during pop-up, push-down operations. The other word bus couples words between SER30 and gate 35.

Consider now the construction and operation of the circuitry involved in causing words to be popped up from and pushed down into SER30. A top of stack extension pointer is shown within dotted lines and referenced as SES32. SES32 contains information that is used to address or point to registers within SER30 for stack adjust operations. SES32 comprises 33 flip-flops (not all shown) connected in tandem to form a shift register. The 33 flip-flops are referenced as SES32–0 through SES32–31 and SES32–B. Thus there is a unique flip-flop within SES32. corresponding to each register within SER30 plus one extra flip-flop (i.e. SES32–B) that indicates when there are no valid words stored in SER30. A 1 is stored in one of these flip-flops and a 0 is stored in all of the other flip-flops. This 1 will hereafter be referred to as the ICS bit. The ICS bit is stored in either the flip-flop corresponding to the register within SER30 containing the word last pushed down into SER30 or else in SES32-B when SER30 contains no valid words.

In response to control signals on the lines labelled +1 and −1, the ICS bit is shifted up and down between the stages of SES32 as words are pushed down into and popped up from the registers of SER30 and therefore SES32 keeps track of the register that is currently the top of stack extension register.

Each of the flip-flop stages of SES32 is coupled by a line not shown to a bus coupled to encode network 44. Encode network 44 is a conventional network of gates that produces a parallel 5 bit encoded output and applies its output to TOSE38. Thus TOSE38 will store a coded number that indicates the address of the register that is currently storing the top of stack extension word. For example, when SER30 is completely full the top word in the stack extension will be stored in SER32–31. Therefore the ICS bit will be stored in SES32–31 and a 0 will be stored in all other stages of SES32. Encode network 44 will respond to this condition of SES32 to produce the binary code 11111 which is the equivalent of decimal 31. The output of the encode network 44 is coupled to TOSE38 for storage. The output of TOSE38 is connected to the input of compare circuit 37. The other input of compare circuit 37 is coupled by a line not shown to SESA47. The purpose of TOSE38 and compare circuit 37 will become clear from the description of FIG. 8.

Also shown within FIG. 2 is a stack extension overflow flip-flop SEOV31 which provides an indication of whether or not the top word in the stack resides in SER30 or has spilled over into memory 20.

Also shown within FIG. 2 is SE/M45. SE/M45 is a flip-flop which indicates whether or not an incomplete mark stack control word resides in SER30 or has spilled over into memory 20. The purpose of SE/M45 will be explained further in connection with the flow chart of FIG. 8.

Except for SES32–B and SES32–31 each intermediate stage of SES32 is coupled to two of the registers within SER30 by two AND gates. When one of these intermediate stages stores the ICS bit it applies a signal to partially enable one of the AND gates to cause a word to be read from its corresponding register within SER30 and to partially enable another AND gate to cause a word to be written into the next higher register within SER30. Thus it can be seen that the information stored in SES32 is actually representative of two adjacent registers within SER30. That is, it points to one register from which a word can be popped up and it points to the next higher register into which a word can be pushed down. The Symbol $SES_R$ is used to mean the address of the register from which a word can be popped up, and the symbol $SES_W$ is used to mean the address of the register into which a word can be pushed down.

Consider now the manner in which words are pushed down into the registers of SER30. When SER30 is completely empty the ICS bit is stored in SES32–B and a 0 is stored in all other flip-flops of SES32. Thus the AND gate having an input coupled to SES32–B (i.e. AND gate 71) will be partially enabled whereas all the other AND gates will be disabled. When it becomes necessary for the execution of a program operator to push a word into SER30, controller 40 generates a push-down signal referenced in FIG. 2 by the symbol PD. The PD signal is coupled by means not shown to the input of one-half of the AND gates coupling SES32 to SER30. One of the AND gates having an input coupled to receive the PD signal is AND gate 71 which has its output coupled to SER30–0. Thus AND gate 71 will be completely enabled and it will cause the word carried by the word bus from gate 16 to be written into SER30–0. After that word is written into SER30–0 controller 40 will generate a control signal to cause the ICS bit to shift up to SES32–0 from SES32–B. The output of SES32–0 is coupled to one input of AND gate 72 and to one input of AND gate 13. The other input to AND gate 72 is coupled by means not shown to controller 40 to receive therefrom a pop-up signal referenced in FIG. 2 by the symbol PU. The other input to AND gate 73 is coupled by means not shown to controller 40 to receive therefrom the PD signal. Thus by virtue of the ICS bit being stored in SES32–0 AND gate 73 will be fully enabled when controller 40 next produces a PD signal. The output of AND gate 73 is coupled to SER30–1 and when AND gate 73 is fully enabled it causes the word carried by the word bus from gate 16 to be written into SER30–1.

Consider now the construction and operation of the circuitry involved in selecting an arbitrary register within SER30 and in causing a word to be exchanged between A register 10 and the selected register. Recall that when a program operator makes reference to a word within a stack, an address couple field of the program operator is transferred to the C register. The ll part of the address couple is compared against the $ll_c$ value stored in a LL register. If the ll value and the $ll_c$ values are the same, the display register selection circuitry DRS checks whether the δ value is less than 31. If the δ value is less than 31, then the address couple is making reference to a register within SER30. Otherwise, it is making reference to a location in memory 20. if the δ value is less than 31 it is gated through gate 52 to the input of gate 53. Controller 40 causes gate 53 to transfer the δ field to a stack extension source address register (SESA47) when the program operator orders a read operation and to transfer the δ field to a stack extension destination register SEDA48 when the program operator orders a write operation. The output of SESA47 is coupled to one input of compare circuit 34. The other input of compare circuit 34 is coupled by a line not shown to gate 52. The purpose of compare circuit 34 will be described hereafter in connection with FIG. 8.

Consider now the read operation. SESA47 is coupled to a read selection matrix SM43 which selects a register within SER30 and the contents of the selected register is gated onto the word bus to gate 35. For example, if the program operator has a δ value of 2 the contents of SER30–2 will be gated through gate 35 to A register 10.

Consider now the write operation. SEDA48 is coupled to a write selection matrix which selects a register within SER30. The contents of A register 10 is gated onto the word bus coupled to gate 35 and written into the selected register.

SM33 is also coupled to SES32 so as to select one of the flip-flop stages therein to be set during the IC to IC transfer operation which is explained in connection with FIG. 9.

Figure 3:
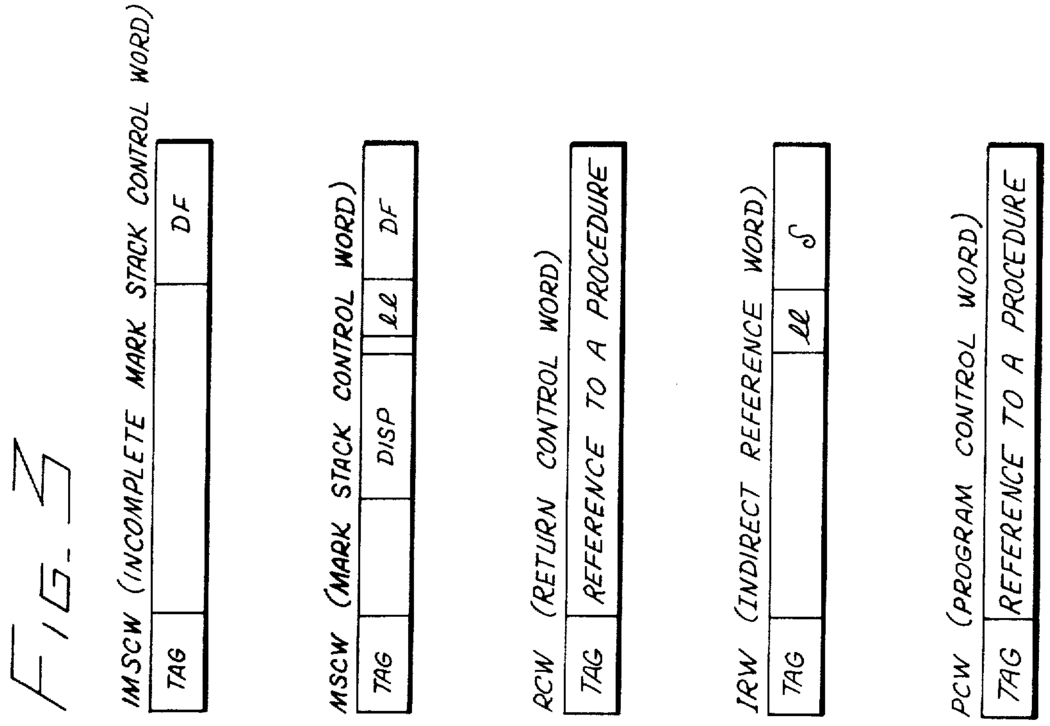
FIG. 3 is a sketch showing the format of the words stored in the stack of the present invention.

Consider now the types of words of information stored in a stack. In general, these words are variables, reference words and control words of various types. FIG. 3 is a sketch which illustrates the word structure of the reference words and the control words used herein. The symbols used as abbreviations of the names of the various words are indicated in parentheses.

Table I gives an explanation of the various symbols used.

TABLE I

| Symbol | Description of Symbol |
|---|---|
| Tag | Identifies type of word. |
| DISP | An increment value which when added to the absolute address contained in the BOSR register gives the address of a MSCW. This value is used to link the MSCWs together to form an address environment list. |
| DF | An increment value which when subtracted from the address of the word in which this field was found gives the address of an MSCW. This value is used to link the MSCWs together to provide stack history list. |
| ll, δ | This is an address couple. The ll part is the lexicographical level of a particular item and points to a particular display register. The δ part is an increment value or relative address. δ can be added to the content of the display register pointed to by ll to produce a main memory address. δ can also be used as a direct address of an item within the addressable stack extension. |
| Reference to a Procedure | The reference to a procedure is actually a plurality of fields which the processor uses to obtain a program string. It includes an ll field giving the lexicographical level of the procedure referred to and includes other fields which the processor uses to find the starting location in main memory of the procedure referred to. |

The control words and reference words shown in FIG. 3 provide the processor with the information needed to link different parts of a program together. The manner in which these words are used to link different parts of a program together is explained in above-identified application Ser. No. 672,042.

The program operator repertory of the machine includes program operators entitled Value call (VALC), Name call (NAMC) Store destructive (STOD), Mark the stack (MKS), Enter, and Exit. Both the VALC and NAMC operators include an address couple field that makes reference to a location within the stack. The VALC operator includes a field that orders controller 40 to cause a word within the referenced location to be brought up to A register 10. The NAMC operator contains a field that orders controller 40 to cause an IRW to be placed in A register 10. The IRW so placed in A register 10 will include the address couple field of the NAMC operator. The STOD operator includes a field that orders controller 40 to store a word in A register 10 into a location pointed to by an IRW in B register 12. The STOD operator will be inserted in the program sequence following a NAMC operator. Thus the combination of a NAMC and an STOD operator causes a word to be stored in a stack location referred to by the address couple field of the NAMC operator. The MKS operator causes controller 40 to place an IMSCW at the top of the stack. The MKS operator is placed in the program sequence when it is desired to enter a new procedure. A new procedure is actually entered in response to the Enter operator and returned from in response to an Exit operator.

Briefly, the sequence of events that occur in anticipation of entering a new procedure are as follows: The MKS operator causes an IMSCW to be entered in the stack. Then a NAMC operator causes an IRW to be placed immediately above the IMSCW. This IRW will contain address information pointing to the PCW for the new procedure. After the IRW is placed in the stack a series of VALC operators will bring parameters to the top of the stack. These are the parameters that will be passed to the new procedure.

Figure 4B:
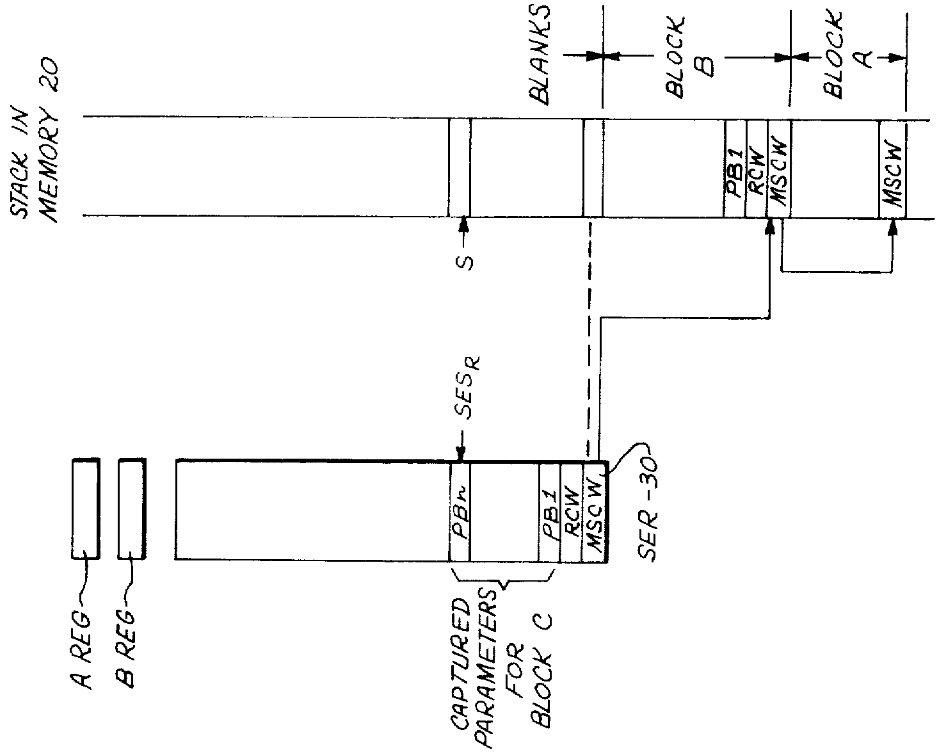
FIG. 4 comprises FIG. 4A and 4B and is a sketch representing a snapshot of the condition of a stack before and after entry into a called procedure.
Figure 4A:
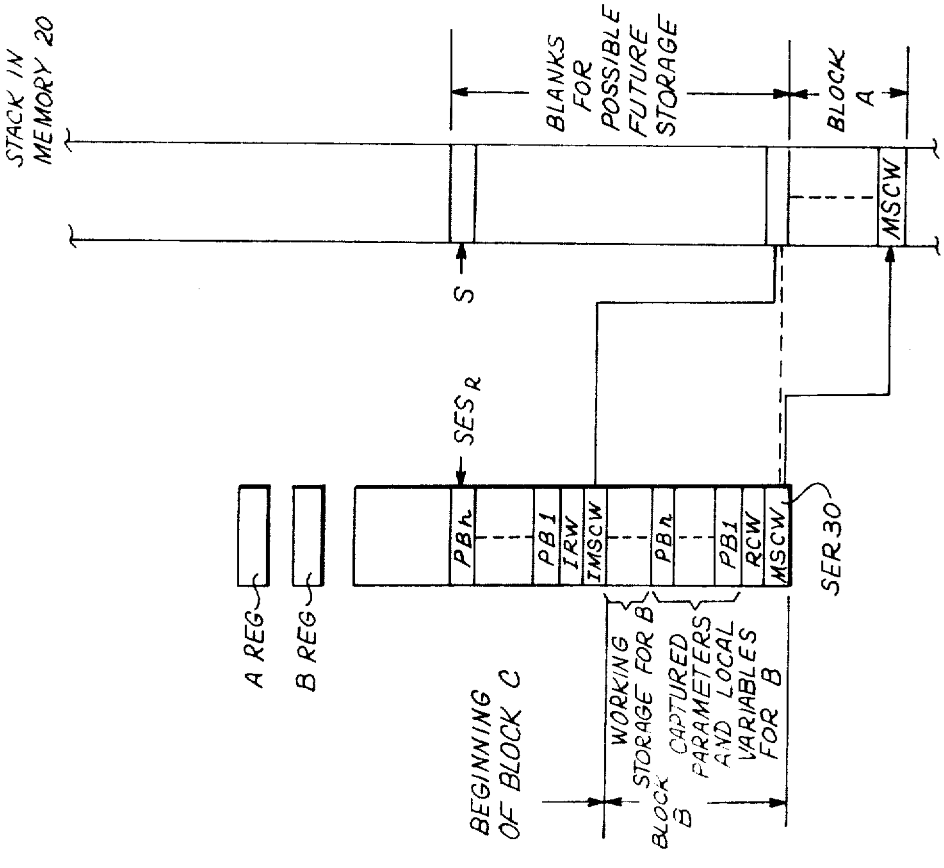

FIG. 4 comprises FIG. 4A and 4B and illustrates how the registers of SER30 are linked to a stack in memory 20. FIG. 4A illustrates the condition of a stack immediately before a new procedure is entered. At the base of the memory stack there is shown the MSCW for an ALGOL block referred to as block A. A dashed line indicates that information related to block A is stored in successive locations above this MSCW.

The information related to an ALGOL block referred to as block B is presently stored in SER30. This information includes an MSCW. The location of this MSCW is considered to be a base address for relative addressing within the current lexicographical level. That is, a program operator making reference to a parameter within the current lexicographical level will contain a δ field which is an address relative to the location of this MSCW. The MSCW contains a DF field pointing to the MSCW for block A and a RCW containing information that will be used whenever block B is exited or returned from. The various parameters and local variables for block B are identified as PBl through PBn and occupy sequential locations up from the RCW. Above PBn there is an indefinite number of registers that are storing operands that have been pushed down into the stack extension and have not yet been digested.

Above this working storage area for block B there is an IMSCW containing a DF field pointing to a memory location that has been kept blank so as to remain available for storage of the MSCW for block B. A dashed line is shown between the MSCW for block B and memory 20 to indicate the corresponding blank location for the MSCW for block B. The next location of the stack extension contains an IRW pointing to the program control word for procedure C. Above the IRW are the parameters which are being passed from block B to block C. $SES_R$ is now pointing to the register of SER30 containing the last entered item which is identified as PCn. As indicated by the symbol S, S register 24 is now pointing to a location of memory 20 corresponding to the same relative address above the blank location for the MSCW for block B as the relative address pointed to by $SES_R$. All of the memory locations above the top word of block A up to the location pointed to by S register 24 are blank and have been reserved for possible future storage of block B. Thus there is a corresponding location reserved in memory 20 for each word stored in SER30.

FIG. 4B illustrates the condition of the stack after procedure C has been entered. Block A remains in memory 20 as before and now all of the information related to block B has been transferred over to fill up the blank locations of memory 20 that correspond to the words relating to block B. The IMSCW for block C has been converted to an MSCW and has been transferred down to the base of stack extension 30. The IRW that pointed to the PCW for procedure C has been replaced by an RCW containing the information that will be used when block C is exited from. This RCW and the parameters that have been passed to block C have been transferred down to the register at the base of SER30.

SES32 has been adjusted so that $SES_R$ now points to the register of SER30 that now stores PCn which was the last item of information entered therein. A dashed line is shown between the MSCW for block C and memory 20 to indicate that a location remains blank for possible future storage of this MSCW. Similarly there are blank locations of memory 20 which remain reserved for possible future storage of the other words stored in SER30.

It is important to note that the parameters that have been passed to block C remain in SER30. Thus they can be accessed and brought to the top of stack registers much more quickly than if they were stored in memory 20. Since these parameters are kept in SER30 they are said to be captured.

Another important point that is brought out by FIG. 4 is that locations within memory 20 are dynamically allocated or reserved for possible future storage of the information that is stored in stack extension 30.

Figure 5:
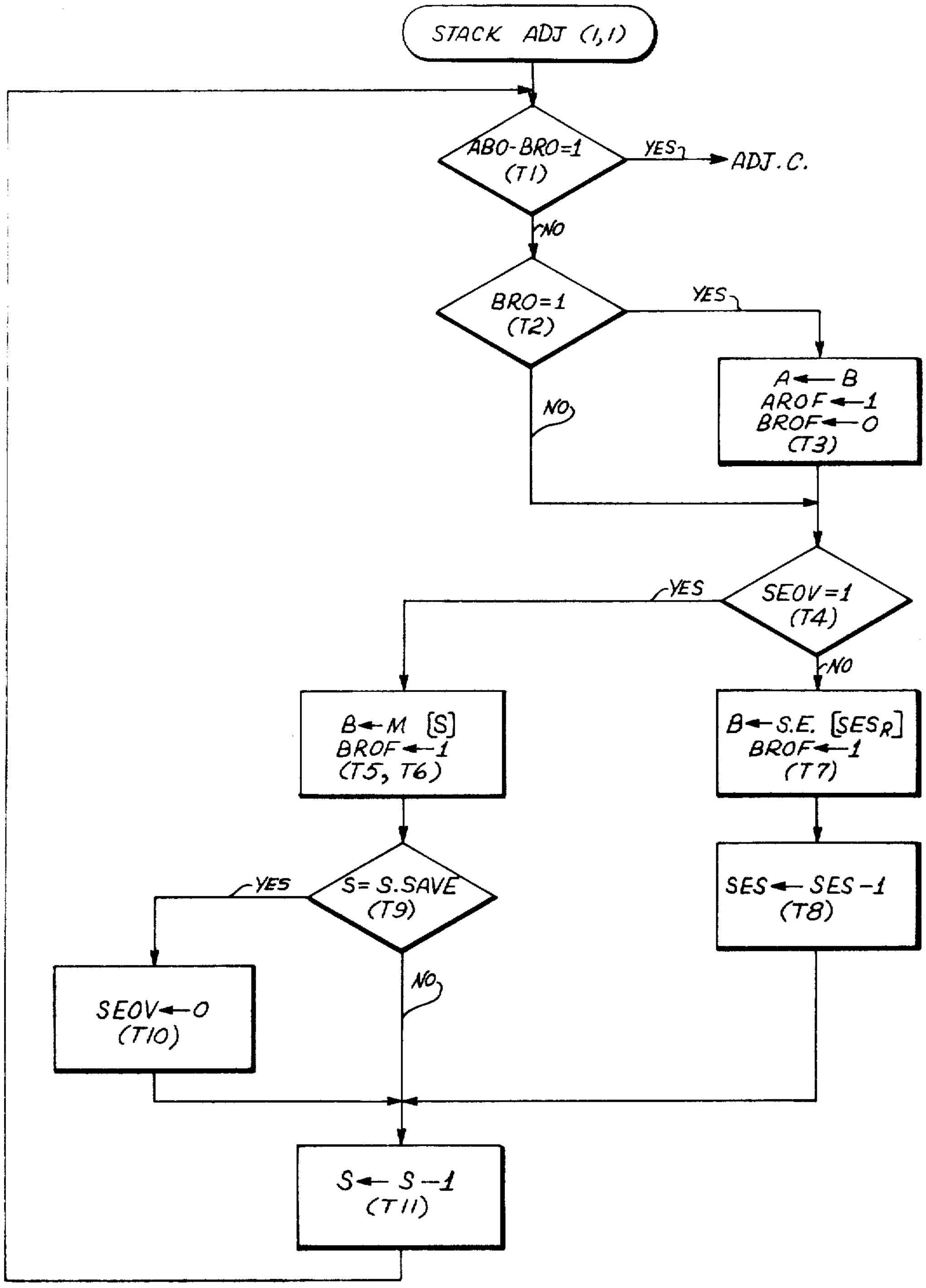
FIG. 5 is a flow diagram of the STK ADJ(1, 1) operation of the present invention.

FIG. 5 is a flow chart illustrating the manner in which a stack organized machine embodying the present invention adjusts the stack so as to fill both the high speed registers that are coupled to the arithmetic and logical unit. Many of the different types of program operators within the instruction repertory of the machine will require such a stack adjustment. For example, in the execution of a Polish notation string an ADD operator will require two operands to be placed in A register 10 and B register 12. The symbol STK·ADJ(1,1) is used to mean the operation wherein words are popped up from the stack to fill A register 10 and B register 12 as needed.

The actual sequence of events and the time required to perform the STK·ADJ(1,1) operation depends upon the initial conditions of A register 10 and B register 12. Controller 40 produces various control signals which cause checks to be made of the status of these registers. The results of these checks are communicated back to controller 40 on the feedback signal lines to inform controller 40 which control signal is to be formed next.

At the outset of the STK·ADJ(1,1) operation, controller 40 produces control signal T1 which causes a check to be made of the status of condition sensor 5 by sampling the ARO·BRO output. If both A register 10 and B register 12 are already filled then ARO·BRO output of condition sensor 5 will be a 1. Thus controller 40 will be informed that stack adjustment is unnecessary and it will produce an adjust complete signal referenced in the flow chart as ADJ·C. If either A register 10 or B register 12 is empty then the ARO·BRO signal will not be a 1 and controller 40 will respond to this result of the check to produce control signal T2. Control signal T2 causes the sampling of the BRO output of condition sensor 5. If the BRO signal is equal to a 1 controller 40 will produce control signal T3; otherwise it will produce control signal T4. Control signal T3 causes the contents of B register 12 to be gated up into A register 10, causes BROF 13 to be reset, and causes AROF 11 to be set. This operation is illustrated in FIG. 5 by the symbols A ← B; BROF ← O; AROF ← 1. Thus, at the end of this operation A register 10 contains a word and is marked as full by AROF11, B register 12 is marked as empty, and controller 40 will proceed to produce control signal T4. Control signal T4 causes a check to be made of the output of SEOV31. Recall that the output of SEOV31 indicates whether or not there has been an overflow of words out of SER30 into memory 20. If SEOV31 is producing a 1 then controller 40 knows that the word to be popped up resides in memory 20. Therefore controller 40 produces in sequence control signals T5 and T6. During T5 and T6 gate 22 transfers the contents of S register 24 to MAR23; RW27 transfers the word addressed by MAR23 to MIR21; gate 36 transfers this word to B register 12; and controller 40 sets BROF13 to a 1. In FIG. 5 this operation is represented symbolically as B ← M[S] and BROF ← 1.

Following T6, controller 40 produces control signal T9 which causes gate 41 to couple the address stored in S register 24 to one input and the contents of S Save register 25 to the other input of compare circuit 42. Compare circuit 42 then indicates whether or not the contents of S register 24 is equal to the contents of S Save register 25. As will be discussed in more detail hereafter S Save register 25 stores the address of memory 20 which stores the first word to spill out of SER30 into memory 20. If S register 24 and S Save register 25 are pointing to the same location at T9 then the word that was popped out of memory during T5 and T6 was the first overflow word. Thus controller 40 will know that there is no longer any overflow and it will produce control signal T10 which resets SEOV31 and then proceeds to produce control signal T11. If S register 24 and S Save register 25 are pointing to different locations then controller 40 will know that an overflow condition still exists and controller 40 will proceed immediately to produce control signal T11. Control signal T11 causes S register 24 to be decremented by one count so that it now points to the proper location. Following control signal T11 controller 40 loops back to again produce control signal T1. If A register 10 and B register 12 are now full then the stack adjustment is complete.

Consider now the sequence which follows control signal T4 when SEOV31 is producing a 0 thereby indicating that no overflow condition exists. Controller 40 responds to an indication that no overflow exists by producing control signal T7. Control signal T7 causes the top word in SER30 be popped up through gate 16 to B register 12 and causes BROF13 to be set to 1. This operation is indicated in FIG. 5 by the symbols B ← SE[$SES_R$B] and BROF ← 1. Following control signal T7, controller 40 produces control signal T8 which causes the ICS bit in SES32 to be shifted down by one so as to point to the new top of stack extension register. This operation is illustrated in FIG. 5 by the symbol SES ← SES − 1. Following T8 controller 40 produces control signal T11 which decrements S register 24 as discussed above.

Figure 6:
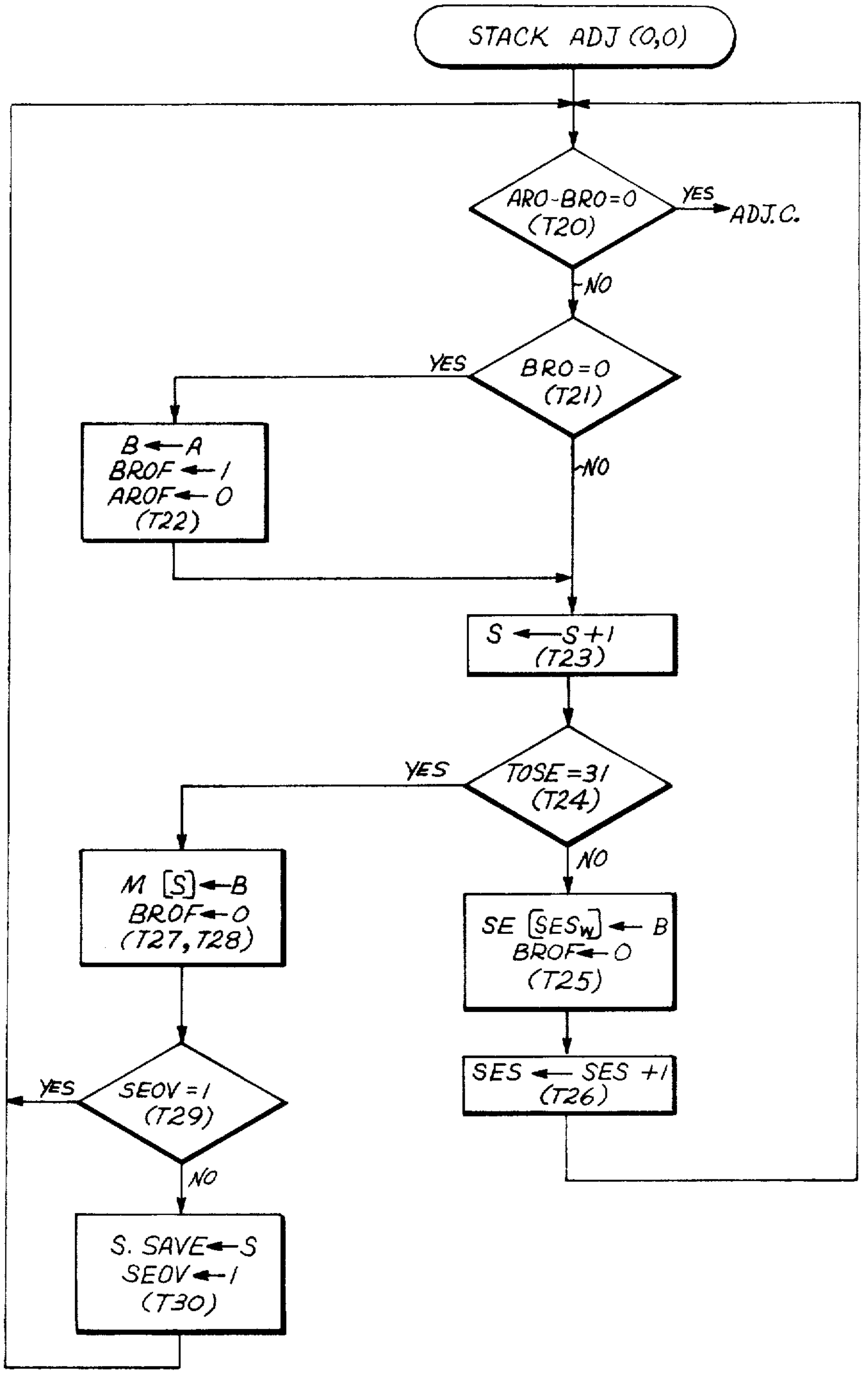
FIG. 6 is a flow diagram of the STK ADJ (0, 0) operation of the present invention.

FIG. 6 is a flow chart illustrating the manner in which words are pushed down into the stack. The symbol STK·ADJ(0,0) is used to mean the operation wherein words are pushed down into the stack so as to make A register 10 and B register 12 empty. This operation is sometimes called adjusting the stack down.

When it becomes necessary to adjust the stack down controller 40 produces control signal T20 which checks the ARO·BRO output of condition sensor 5. If ARO·BRO is already 0 both A register 10 and B register 12 are already empty and stack adjustment is complete. Otherwise, controller 40 produces control signal T21 to determine whether B register 12 is empty or full. If BRO is 0 then controller 40 produces control signal T22 to cause the contents of A register 10 to be gated into B register 12, to cause B register 12 to be marked as full and to cause A register 10 to be marked as empty. Following this operation or following T21 if BRO is not equal to 0 controller 40 produces control signal T23. Control signal T23 causes S register 24 to be incremented by 1. Following control signal T23, controller 40 produces control signal T24 which causes a check to be made of the contents of TOSE38. Recall that TOSE38 stores a binary coded number representative of the address of the top of stack extension register. If TOSE stores the binary number equivalent of 31 then SER30 is completely full. If the check of TOSE38 indicates that SER30 is already full, controller 40 produces in sequence control signals T27 and T28 which cause the contents of B register 12 to be pushed down into the location of memory 20 pointed to by S register 24 and then marks B register 12 as empty. Following control signal T28, controller 40 produces control signal T29 which causes the output of SEOV31 to be checked. If the output of SEOV is a 0 then controller 40 produces control signal T30 which causes gate 41 to gate the contents of S register 24 into S Save register 25 and which causes SEOV31 to be set to indicate an overflow condition. Following control signal T30 controller 40 loops back to again produce control signal T20. Thus it can be seen that S Save register will store the address of the first word to overflow into memory 20. If the output of SEOV has already been set at 1 then controller 40 bypasses control signal T30 and immediately loops back to produce control signal T20 again.

Consider now the sequence of events following control signal T24 when TOSE is not equal to 31 thereby indicating that SER30 is not yet full. Controller 40 produces control signal T25 which causes the contents of B register 12 to be pushed down into the register within SER30 that is pointed to be SES32 and causes B register 12 to be marked as empty. Following control signal T26 controller 40 loops back to form control signal T20 again. Thus controller 40 will proceed through the loops as illustrated in FIG. 6 until both A register 10 and B register 12 have been marked as empty.

Figure 7:
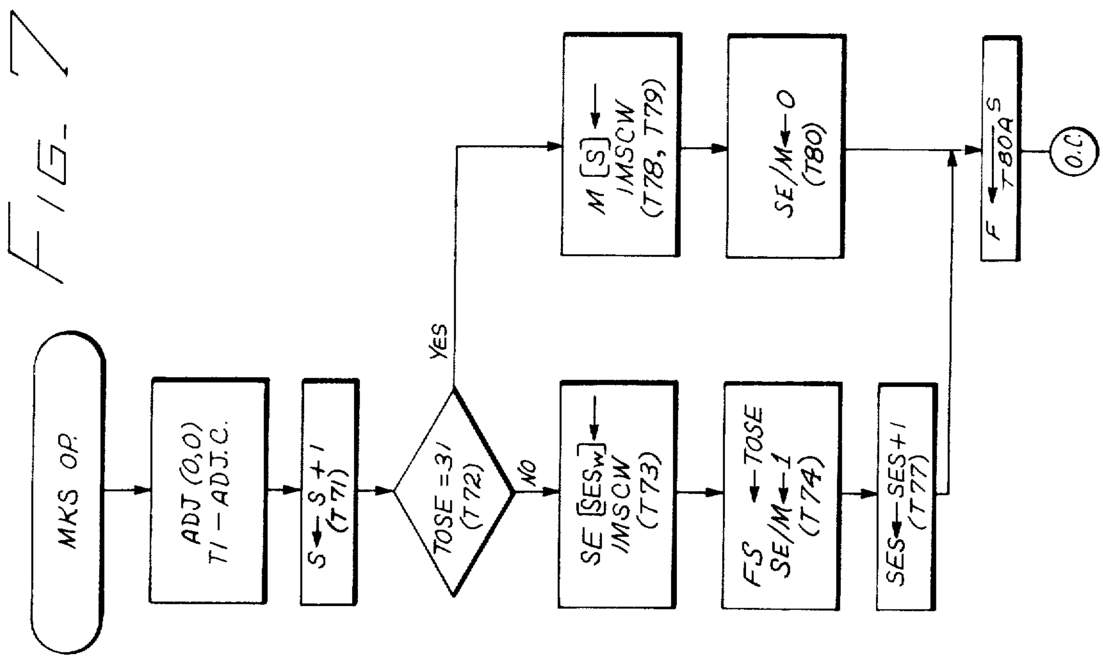
FIG. 7 is a flow diagram of the Mark Stack (MKS) operation of the present invention.
Figure 8:
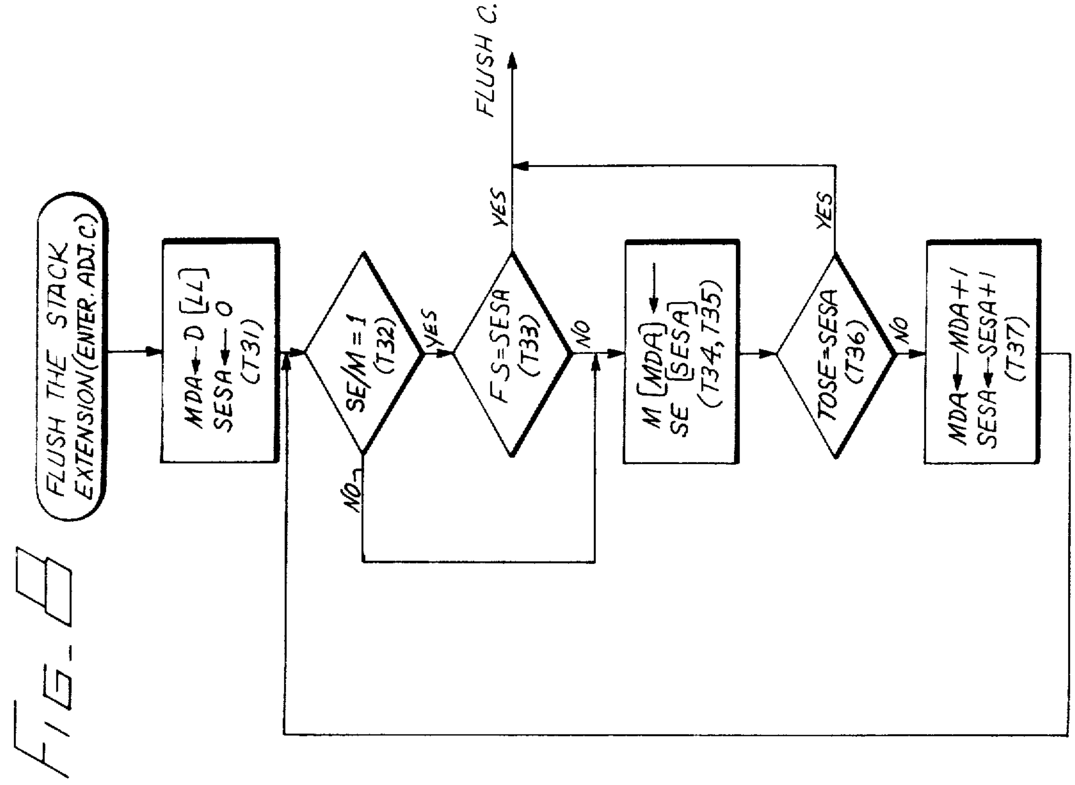
FIG. 8 is a flow diagram showing the manner in which words are transferred from the stack extension registers to main memory to make these registers available for storing words to be used during execution of a called procedure.
Figure 9:
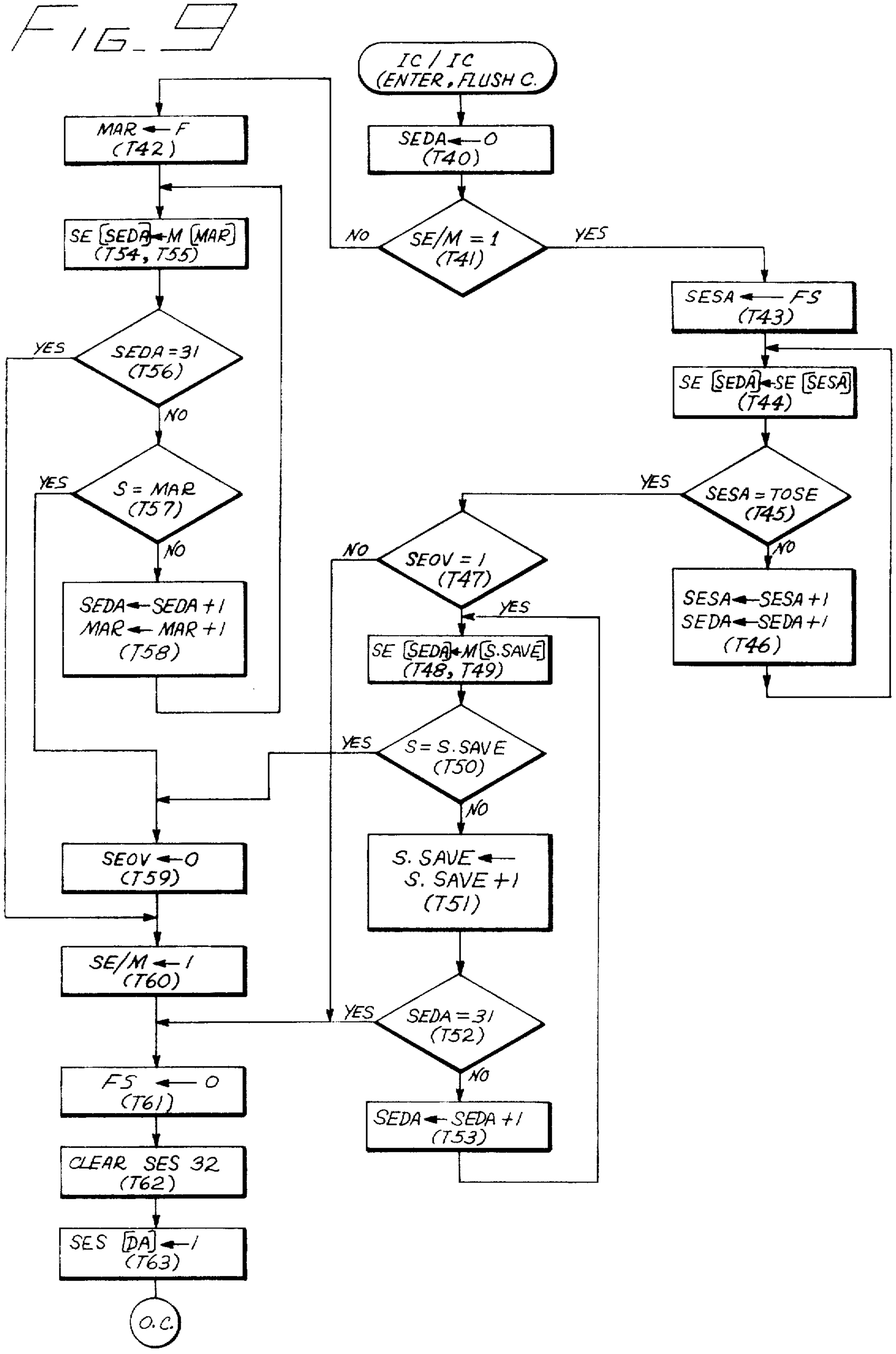
FIG. 9 is a flow diagram showing the manner in which the words to be used in executing a called procedure are stored into the stack extension registers.

FIGS. 7, 8, and 9 show in flow chart form the sequence of events involved in entering a called procedure. Before a called procedure is entered, an MKS operator is executed to place an IMSCW into the stack. FIG. 7 shows the sequence of events involved in forming an IMSCW. After the completion of the MKS operator a series of words are placed in the stack above the IMSCW as shown in FIG. 4. After these words have been placed in the stack an Enter operator is executed. The execution of the Enter operator involves a series of phases. Briefly, during the execution of the Enter operator, the processor determines the starting location of the program string for the called procedure by using the information contained in the words shown in FIG. 3. Additionally, the processor updates the display registers shown in FIG. 1 so that they will reflect the addressing environment for the called procedure. These features of the Enter operator are explained in detail in above-identified application Ser. No. 672,042 and are not necessary for an understanding of the present invention. Only those parts of the Enter operator which are relevant to the present invention are explained herein. The relevant parts are an operation called flushing the stack extension and an operation called an IC to IC transfer. FIGS. 8 and 9 show in flow chart form the sequence of events involved in flushing the stack extension and in the IC to IC transfer respectively.

Refer now to FIG. 7. Before a new procedure is entered an MKS operator will be placed in P register 28. Controller 40 will respond to the MKS operator to adjust the stack down. Following the ADJ·C signal controller 40 produces control signal T71 which causes S register 24 to be incremented by 1. Then controller 40 produces control signal T72 to cause a check to be made of the contents of TOSE38. If TOSE38 stores the binary equivalent of decimal 31 thereby indicating that SER30 is full, controller 40 branches to produce in sequence control signals T78 and T79. These two control signals cause an IMSCW to be stored in the location of memory 20 that is pointed to by S register 24. Following control signals T78 and T79 controller 40 produces control signal T80 which causes SE/M45 to be reset to 0 thereby indicating that the IMSCW resides in memory 20. If the check of TOSE38 during control signal T72 reveals that SER30 is not full controller 40 produces control signal T73 which causes the IMSCW to be stored in the register within SER30 that is pointed to by SES32. Then controller 40 produces control signal T74 which causes the contents of TOSE38 to be gated through gate 52 into the FS register within block 50. This operation is illustrated in FIG. 7 by the symbol FS ← TOSE. Control signal T74 also causes SE/M45 to be set to 1 thereby indicating that the IMSCW resides in SER30. Following control signal T74 controller 40 produces control signal T77 which causes the ICS bit to be shifted up one stage within SES32. Thus at the completion of the MKS operation an IMSCW will be stored in the top location of the stack and SE/M45 will indicate whether this top location is in memory 20 or in SER30.

Following control signal T77 or T80 controller 40 produces control signal T80A which causes the contents of S register 24 to be gated through gate 52 into the F register within block 50. This is required to maintain an absolute address in the F register to point at the most recent IMSCW.

FIG. 8 shows in flow chart form the sequence of operations involved in transferring from SER30 to memory 20 all of the words related to the procedure which called a new procedure. This is the operation called flushing the stack extension. This operation is performed in response to the Enter operator and commences after the stack has been adjusted down. At the outset of this operation controller 40 produces control signal T31. Control signal T31 causes the contents of the display register for the lexicographical level of the calling procedure to be gated into the MDA register. The lexicographical level is stored in the LL register and this operation is indicated in FIG. 8 by the symbol MDA ← D[LL]. Control signal T31 also causes SESA47 to be cleared. This operation is indicated by the symbol SESA ← O. After control signal T31, controller 40 produces control signal T32 which causes a test to be made of SE/M45. If SE/M45 is in the 1 state thereby indicating that the IMSCW resides in SER30, controller 40 next produces T33; otherwise controller 40 bypasses T33 to produce control signals T34 and T35. Control signal T33 causes a check to be made of the output of compare circuit 34. The inputs being compared by compare circuit 34 are the contents of SESA47 and FS. If compare circuit 34 indicates equality then the flushing of SER30 is complete; otherwise controller 40 produces in sequence the control signals T34 and T35. These control signals cause the contents of the register within SER30 that is addressed by SESA47 to be stored in the location of memory 20 that is addressed by the contents of the MDA register. This operation is indicated in FIG. 8 by the symbol M[MDA] ← SE[SESA]. Then controller 40 produces control signal T36 which causes compare circuit 37 to check for equality between the contents of TOSE38 and SESA47. If equality exists the top of the information in the stack extension registers 30 has been reached and the flushing operation is complete. If inequality exists then controller 40 produces control signal T37 which causes both the MDA register and SESA47 to increment by 1. Then controller 40 loops back to produce control signal T32 again.

FIG. 9 shows in flow chart form the sequence of operations involved in transferring down to the base of SER30 all of the words related to the called procedure. This operation is sometimes called an IC to IC transfer. The IC to IC transfer commences after the flushing of the stack extension. At the outset of this operation, controller 40 produces control signal T40 which causes SEDA48 to be set to point to SER30–0. After control signal T40, controller 40 produces control signal T41 which causes a check to be made of SE/M45. If SE/M45 is producing a 1 thereby indicating that the IMSCW resides in SER30 then controller 40 produces control signal T43 which causes the contents of the FS register to be gated into SESA47. This operation is indicated in FIG. 9 by the symbol SESA ← FS. At the completion of this operation SEDA48 is pointing to SER30–0 and SESA47 is pointing to the register within SER30 that contains the IMSCW. Therefore the IMSCW can be read out of SER30 and be written into the register at the bottom of the stack extension. Controller 40 produces next control signal T44 which causes this transfer which is indicated in FIG. 9 by the symbol SE[SEDA] ← SE[SESA]. Controller 40 next produces control signal T45 which causes compare circuit 37 to produce an indication of whether or not the contents of TOSE38 and the contents of SESA47 are equal. If they are not equal then controller 40 knows that there are more words in SER30 which have not been transferred down. Therefore controller 40 produces control signal T46 which causes SESA47 and SEDA48 to be incremented by one and then controller 40 loops back to produce control signal T44 again. Thus through this loop controller 40 will cause the transfer of words starting with the IMSCW up to the top word in SER30 down to the base of SER30.

When the check caused by control signal T45 reveals that the top word in SER30 has been transferred down, controller 40 branches to produce control signal T47 which causes a check to be made of SEOV31. This check is made to determine whether or not there are words that have spilled over into memory 20 that should be transferred down to SER30. If there has been an overflow controller 40 will produce in sequence control signals T48 and T49.

In response to control signals T48 and T49 gate 41 transfers the address in S Save register 25 into MAR23, and R/W27 causes the addressed word to be read out into MIR21. This word is then written into SER30. This operation is indicated in FIG. 9 by the symbol SE[SEDA] ← M[S Save].

After control signal T49, controller 40 produces control signal T50 which causes a check to be made of compare circuit 42. If compare circuit 42 indicates that S register 24 and S Save register 25 are pointing to the same address then controller 40 knows that there are no more words in memory 20 which have to be transferred down into SER30. If there are more words to be transferred down controller 40 next produces control signal T51 which causes S Save register 25 to be incremented by one. Then controller 40 produces control signal T52 which causes a check to be made of SEDA48. If SEDA is pointing to SER30–31 then SER30 has been filled and there are no more registers available within SER30. If SEDA48 is pointing to any other register then controller 40 next produces control signal T53 which causes SEDA48 to be incremented by one. Then controller 40 loops back to produce control signals T48 and T49 again. Therefore through this loop controller 40 will cause the transfer from memory 20 into SER30 of all of the overflow words that will fit into SER30.

If the result of the comparison of S register 24 and S Save register 25 during control signal T50 reveals that all of the words in memory 20 have been brought down into SER30 then controller 40 branches to produce control signal T59. Control signal T59 resets SEOV31. Therefore that flip-flop will no longer indicate that an overflow condition exists. After control signal T59 controller 40 produces control signal T60 which sets SE/M45 so that the flip-flop will indicate that the IMSCW now resides in SER30 and not in memory 20.

After control signal T60 or after control signal T52 if SEDA48 stores the number 31, controller 40 produces control signal T61 which causes the FS register to be reset. This is done to make the FS register point to the location of the IMSCW which is now stored in SER30–0.

After control signal T61, controller 40 produces control signal T62 which causes all of the flip-flop stages of SES32 to be reset. This operation is indicated in FIG. 9 as clear SES32. Then controller 40 produces control signal T63 which causes a 1 to be written into the flip-flop stage within SES32 that is pointed to by SEDA48. This operation makes the ICS bit in SES32 point to the new top of stack extension register.

Consider now the sequence following control signal T41 when the IMSCW resides in memory 20. This is indicated by SE/M45 being in the 0 state. Controller 40 produces control signal T42 which causes the address in the F register to be gated to MAR23 through gates 52, 51, and 29 and address adder 26. Then controller 40 produces in sequence control signals T54 and T55. In response thereto R/W27 will read out the addressed word into MIR21, and the word will be written into the stack extension register pointed to by SEDA48. This operation is indicated in FIG. 9 by the symbol SE[SEDA] ← M[MAR].

After control signals T54 and T55 controller 40 produces control signal T56 which, like control signal T52, checks whether SER30 is full. If SEDA48 is pointing to SER30–31 then the SER30 is full and controller 40 branches to produce control signal T60 and proceeds as discussed above. If SEDA48 is pointing to any other register within SER30 then controller 40 produces control signal T57. Control signal T57 causes gate 41 to couple the contents of MAR23 to one input and to couple the contents of S register 24 to the other input of compare circuit 42. Therefore, compare circuit 42 produces an output indicating whether or not the address of the word which was just read out of memory 20 during T54 and T55 is equal to the address stored in S Save register 25. If compare circuit 42 indicates equality exists then controller 40 knows that the word which was just read out of memory 20 was the last word to be transferred down into SER30. If this last word has already been transferred down controller 40 branches to produce control signal T60 and proceeds as described above.

If this last word has not yet been transferred down, controller 40 produces control signal T58 which causes MAR23 and SEDA28 each to increment by one and then controller 40 loops back to produce control signals T54 and T55 again. Thus through this loop controller 40 causes the transfer from memory 20 to SER30 of all of the words relating to the new procedure that will fit into SER30.

It should be noted that other program operators in addition to the Enter operator can cause words to be captured in SER30. For example, at the completion of the execution of a called procedure the processor returns to the calling procedure. The Exit operator is included in the program operator repertory to cause the processor to return to the calling procedure. The Exit operator, like the Enter operator, involves a series of phases wherein the stack history and address environment lists are updated, the display registers are updated to reflect the new addressing environment, and the program string for the procedure exited to is obtained. These features of the Exit operator are not necessary for an understanding of the present invention and are not explained in detail herein.

The Exit operator causes the stack to be cut back so as to eliminate the part of the stack related to the procedure exited from. This is achieved by setting the S register 24 so that it points to F–1. Then the location of the MSCW for the procedure exited to is determined. This determination is made from the stack history list by subtracting from the current F register setting the DF field of the MSCW for the procedure exited from. After this determination is made the F register is updated to point to the MSCW for the procedure exited to. Now the words related to the procedure exited to that are stored above the updated F register setting can be transferred over to SER30 in block transmitting fashion in substantially the same manner that words are flushed out of SER30 upon procedure entry. Once these words have been transferred over to SER30 they will be captured therein during the execution of the procedure exited to.

Figure 10:
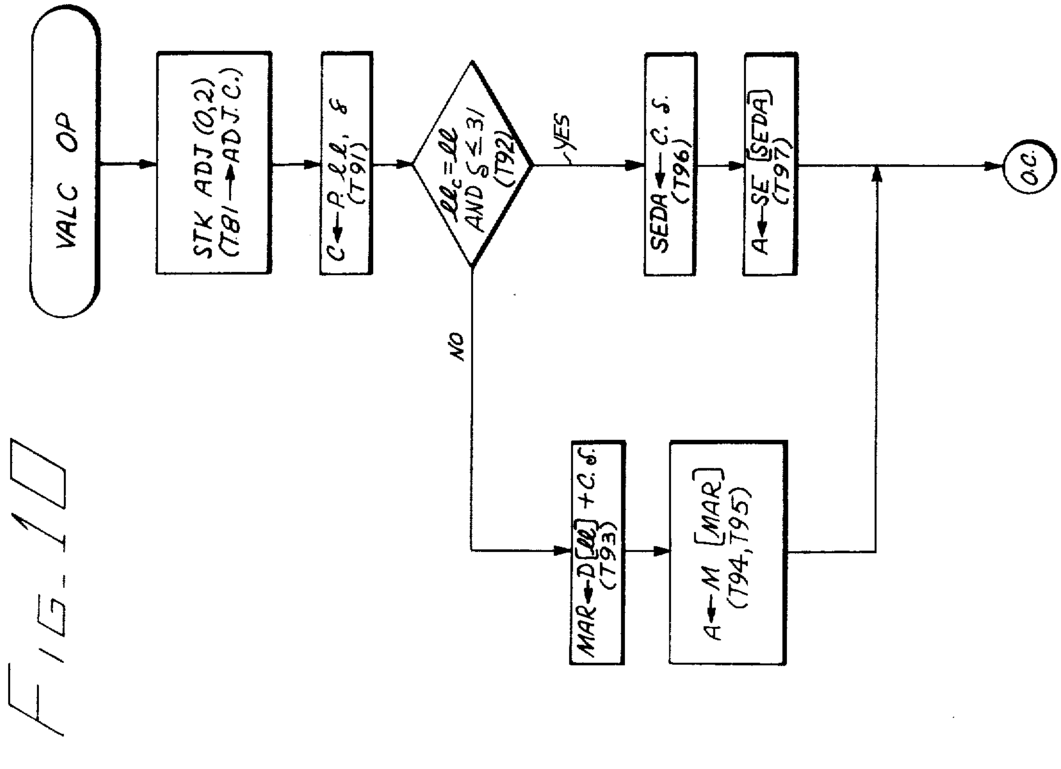
FIG. 10 is a flow diagram showing the manner in which a parameter captured in a stack extension register is called to the top of the stack.

FIG. 10 shows in flow chart form the sequence of operations involved in executing a VALC operator. When a VALC operator is read from memory 20 and placed in P register 28, controller 40 adjusts the stack down so as to make sure that A register 10 is empty and thereby available to accept the word which the VALC operator is calling to the top of the stack. This operation is symbolized in FIG. 10 by the symbol STK·ADJ(0,2). This operation is so similar to the STK·ADJ(0,0) operation that it need not be explained in detail. The chief difference between these operations is that the STK·ADJ(0,0) operation causes both A register 10 and B register 12 to become empty whereas the STK·ADJ(0,2) operation causes A register 10 to become empty and ignores the condition of B register 12. Following the STK·ADJ(0,2) operation controller 40 produces control signal T91 which causes the address couple field of the VALC operator to be gated into the C register through gate 52. This operation is shown in FIG. 10 by the symbol C ← P.ll, δ.

Then controller 40 produces control signal T92. This control signal causes the DRS circuitry to compare the ll value of the address couple against the $ll_c$ value stored in the LL register. Control signal T92 also causes the DRS circuitry to test whether the δ value of the address couple is greater than 31. If the ll value equals the $ll_c$ value and δ is less than or equal to 31 then the word being referenced resides in SER30. If the $ll_c$ value is different from the ll value or if δ is greater than 31 the word being referenced resides in memory 20 and a main memory access must be made. If the referenced word resides in memory 20 controller 20 causes the word to be read out of memory in the manner disclosed in above-identified U.S. Pat. No. 3,461,434. This operation is indicated in FIG. 10 by the symbols MAR← D[ll] + C.δ which occurs during control signal T93 and A ← M[MAR] which occurs during control signals T94 and T95.

If the referenced word resides in SER30 controller 40 produces control signal T96 which causes the δ part of the address couple now stored in the C register to be gated into SEDA48 through gates 52 and 53. This operation is indicated in FIG. 10 by the symbol SEDA← C.δ. Next, controller 40 produces control signal 97 which causes the word addressed by SEDA to be read out of SER30 and gated up to A register 10 through gate 35. This operation is indicated in FIG. 10 by the symbol A ← SE[SEDA].

Thus it can be seen that when the referenced word resides in SER30 there is no need to access memory 20 and the referenced word can be brought to the top of the stack much more quickly. This feature of the present invention contributes significantly to the computing power of a stack organized machine.

What is claimed is:

1. In a programmable data processing system, the combination comprising an arithmetic unit; a main memory having a first access time for storing stacks of information; a stack mechanism for reading and writing information in stacks; an addressable stack extension memory linked to a stack of information in the main memory for capturing information items that can be referred to in a programmatic procedure building the stack, the stack extension memory having a second lower access time so that it can be accessed more quickly than the main memory; and means responsive to a predetermined program operator for selecting an address of the stack extension memory for access and for coupling an information item captured therein to the arithmetic unit.

2. In a data processing system according to claim 1 wherein said coupling means comprises a pair of registers, in addition to said main memory and stack extension memory, into which information items are stored for processing by said arithmetic unit.

3. In a data processing system according to claim 1 wherein said stack mechanism is operable for writing information into and subsequently reading information out of said stack extension memory on a first in last out sequence for processing by said arithmetic unit.

4. In a data processing system according to claim 3 comprising means for indicating when said stack extension memory is full, said stack mechanism having means responsive to a full indication for writing in and reading out additional information items into a stack in said main memory which stack extends out from the top of the stack of information items in said stack extension memory.

5. In a data processing system according to claim 1 comprising means for addressing memory location in said stack extension memory and for reading out an information item therefrom for coupling to said arithmetic unit.

6. A data processing system comprising a main memory for storing stacks of information, a stack mechanism for reading or writing information in stacks in the memory and a register coupled to an arithmetic unit and to the main memory for exchanging information therebetween, a plurality of addressable registers for capturing information items that can be referred to in a programmatic procedure building a stack; first means for linking the addressable registers to a stack in memory so that they form a stack extension, the first means including means responsive to predetermined program operators for exchanging information items between the register coupled to the arithmetic unit and the addressable registers on a last in, first out basis; and second means responsive to other predetermined program operators for selecting any one of the addressable registers and coupling information items captured therein to the register coupled to the arithmetic unit.

7. The system as defined in claim 6 wherein the first means includes stack extension pointing means for storing an indication of the addressable register containing the information item which was last written in and which has not yet been read out of the stack extension registers by the first means, thereby pointing to the top information item in the stack extension.

8. The apparatus as defined in claim 7 wherein the stack extension pointing means comprises a plurality of flip flop circuits connected in tandem to form a shift register, means for coupling the stack extension registers to the flip flops so that a one to one correspondence exists between the registers and the flip flops, and means for shifting an indicating signal up and down within the shift register so that the indicating signal is stored by the flip flop corresponding to the register containing the information item at the top of the stack extension.

9. The apparatus as defined in claim 8 wherein the shift register further includes a flip flop for storing an indicating signal when the stack extension is empty.

10. The apparatus as defined in claim 6 wherein the first means includes a register for storing an indication of a main memory location reserved for storing an information item in main memory from which the information items in the stack extension registers extend, thereby serving to link the information time in the stack extension register to the rest of a stack of information in the main memory.

11. The apparatus as defined in claim 10 wherein the means for exchanging information items with the addressable stack extension registers on a last in, first out basis is further operative to adjust the register for storing an indication of a main memory location so that it points to incrementally different memory locations.

12. A data processing system comprising main memory means for storing program operators of procedures and words for processing; a processor including a local memory having a plurality of addressable registers and having means for indicating that it is full when all its addressable registers contain words and when it is not full; and a stack mechanism responsive to a string of program operators and an indication that the local memory is not full for storing words obtained from the main memory into sequential locations of the local memory thereby building a stack in the local memory and responsive to the string of program operators and an indication that the local memory is full for storing additional words into sequential locations of the main memory thereby building in the main memory a stack which represents an overflow of the stack in the local memory, the stack mechanism including a register adjustable for storing while the stack is being built in the local memory an indication of a main memory location reserved for storing the current word at the top of the stack in the local memory thereby establishing a one to one correspondence between local and main memory locations and adjustable for storing while the overflow stack is being built in the main memory an indication of the main memory location actually storing the word at the top of the stack in main memory, the stack mechanism having means responsive to a predetermined program operator for inserting a mark word into the stack to mark a stack area to be used to store words for a procedure and having means responsive to another predetermined program operator directing the processor to enter a called from a calling procedure to transfer from the registers of the local memory to the corresponding locations of the main memory the part of the stack that was built up in the local memory by the calling procedure, thereby making those registers available for use in executing the called procedure.

13. The system as defined in claim 12 wherein the processor has an arithmetic unit and the stack mechanism includes a pair of registers coupled to the arithmetic unit to transfer for processing therein the top two words of a stack and stack adjusting means responsive to a predetermine operator to transfer the top two words of the stack to the pair of registers, whereby the words appear to pop-up, the stack adjusting means including means for indicating an overflow condition exists when a stack is built in the main memory while the local memory is full, the stack adjusting means responding to an indication that an overflow condition by transferring the top word of the stack from the main memory and responding to an indication that an overflow condition does not exist by transferring the top word of the stack from the local memory.

14. The system as defined in claim 13 wherein the stack adjusting means is operative in response to a predetermined operator to transfer out of the pair of register any words stored therein, whereby the words appear to be pushed down, the stack adjusting means responding to an indication that the local memory is full by transferring a word into the main memory and responding to an indication that the local memory is not full by transferring a word into the local memory.

15. The system as defined in claim 14 wherein the stack mechanism includes a register settable to store an indication of the main memory location used to store the first word of the stack to overflow out the local memory and into the local memory, and the stack adjusting means is operative to set the settable register during a push-down operation in response to indications that the local memory is full and that an overflow condition did not exist prior to the push-down operation.

16. The system as defined in claim 12 wherein the processor includes a register for storing an indication of a main memory location reserved for storing the mark word for the procedure that is currently being executed and a register for storing an indication of the location of a mark word for a procedure to be entered from the current procedure.

17. In a system having a main memory and a processor for processing a stack of information a part of which is stored in the main memory, a mark word being stored in a location of the memory at the base of each stack area used to store information words for a particular level of a program, the locations of the mark words serving as base addresses for relative addressing to exchange information between the processor and the main memory, the apparatus comprising an addressable local memory for the processor, the local memory having a plurality of registers for temporarily storing a part of the stack which is used for the current program level being executed and having means for indicating which of said plurality of registers stores the top word of the part of the stack stored therein; a register for storing an indication of a main memory location reserved for storing a word at the top of the stack, thereby serving to link the local memory to the main memory as a stack extension; means for storing a mark word in one of the registers of the local memory; a register for storing for the current program level a reference word which includes a level value and an index value, the level value indirectly indicating a base address and the index value indicating an address relative to the indicated base address; and means responsive to a reference word having a level value equal to the current program level for addressing the local memory relative to the location of the mark word stored therein with the index value, thereby enabling information to be recovered from the stack without accessing the main memory.

* * * * *